May 16, 1967  T. A. BENTLEY ET AL  3,319,488

ADJUSTABLE LINK

Filed April 29, 1965

INVENTORS.
THOMAS A. BENTLEY
and CARL D. JACKSON
BY Lockwood, Woodard, Smith & Weikart
Attorneys

United States Patent Office 3,319,488
Patented May 16, 1967

3,319,488
ADJUSTABLE LINK
Thomas A. Bentley, North Little Rock, Ark., and Carl D. Jackson, Fortville, Ind., assignors to C. D. Jackson Manufacturing, Inc., Fortville, Ind., a corporation of Indiana
Filed Apr. 29, 1965, Ser. No. 451,833
3 Claims. (Cl. 74—586)

This invention relates generally to an adjustable link for attaching farm or construction implements to a tractor and particularly to an adjustable link in which the eyelet or attaching loop at the extensible end of the link remains in the same plane as adjustable extension or retraction of the link proceeds.

In providing an adjustable length link for a three-point hook-up or attachment of a grader-bucket, for example, to a tractor, it is important that the link have the required strength and that the length of the link be conveniently adjustable. These features usually dictate a construction in which rotation of a threaded member provides the necessary link-length variation. Direct attachment of the terminal eyelet of the link to the threaded member or spindle forces the link to rotate with the spindle during adjustment and prevents the making of any adjustment unless the eyelet is free or unattached to an implement.

It is the primary object of the present invention to provide an adjustable link in which the attaching eyelets remain in the same plane, that is, do not rotate, as adjustment of the length of the link proceeds.

A further object of the present invention is to provide an adjustable link of the threaded spindle type which is rigid and strong and in which the manually operable member for adjusting the link is readily accessible.

These and other objects will become apparent as the description proceeds with reference to the accompanying drawings in which.

Figure 3:
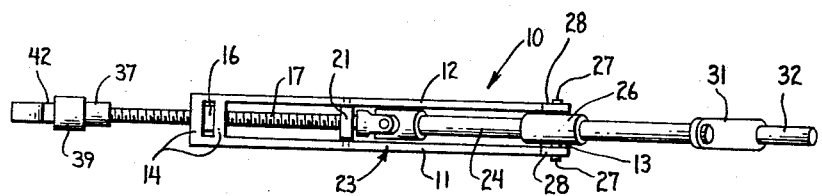
FIG. 3 is a top, plan view of the adjustable link.

Referring to the drawings, the adjustable link of the present invention includes an elongated frame indicated generally at 10, formed by spaced side members 11 and 12, the transverse portions 13 and 14 (FIG. 3) maintaining the spaced relation of the side members.

Figure 2:
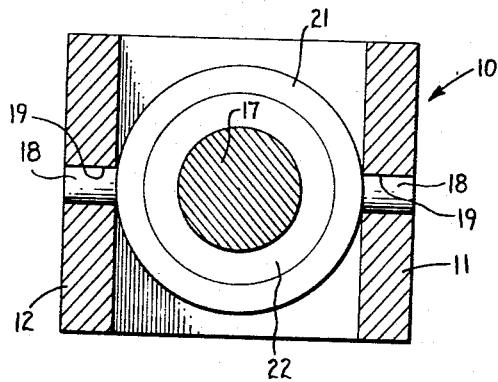
FIG. 2 is an enlarged, sectional view taken generally along the line 2—2 of FIG. 1.

The transverse portion 14 is slotted so as to accommodate a nut 16 having a threaded aperture therein accommodating a threaded spindle or shaft 17. The spindle is maintained in axially parallel relation to the frame 10 by guide means. This guiding function is provided by stub shafts 18 which ride within slots 19 in the frame side members 11 and 12. The stub shafts extends from diametrically opposite sides of a bearing member 21. The bearing permits free rotation of an unthreaded portion of the spindle 17 accommodated within the bearing and a seal 22 (FIG. 2) carried by the bearing prevents the entry of dust or dirt into the supported spindle area. The shafts 18 are free to move within the slots 19 so that, while the bearing member 21 does not rotate, it may be shifted along the axial length of the frame 10.

A U-joint, indicated generally at 23, joins the adjacent end of the spindle 17 to a crankshaft 24. The U-joint operates in conventional fashion and transmits rotation of crankshaft 24 to the spindle 17 but permits angular inclination of the shaft with relation to the spindle. The shaft is supported by a slip sleeve 26, within which the shaft is free to rotate, the sleeve being pivotally supported by pins 27 which extend between the slip sleeve and apertures in upright frame members 28.

Figure 1:
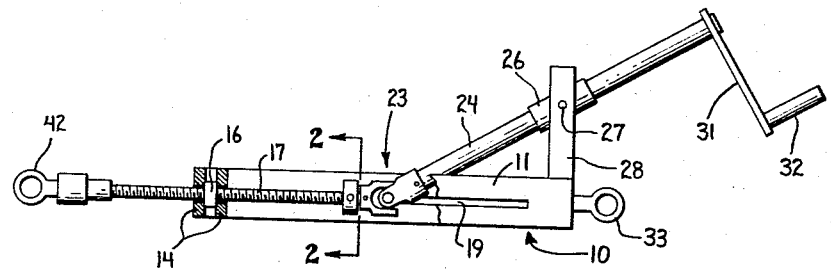
FIG. 1 is a side view, partially in section, of an adjustable link embodying the present invention.

The upper end of the crankshaft 24 is provided with an arm 31 carrying a handle 32 which adapts the crankshaft to manual rotation. As may best be seen in FIG. 1 an attaching eyelet 33 is rigidly secured to the frame 10.

Figure 4:
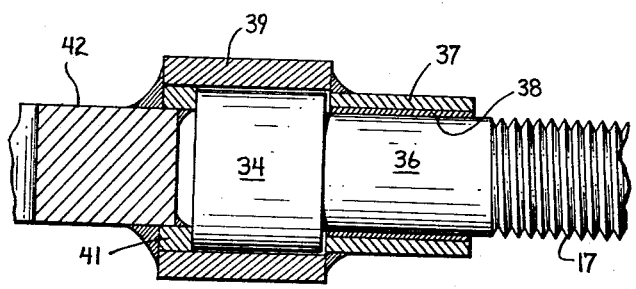
FIG. 4 is an enlarged, sectional view of the end portion of the adjustable link.

Referring now to FIG. 4, the extending end of the spindle 17 is provided with an enlarged, cylindrical head 34. The unthreaded, adjacent portion 36 of the spindle is encircled by a bearing sleeve 37, an anti-friction bushing 38 being interposed between the sleeve and the shaft portion 36. Welded to the sleeve 37 and freely encircling the head 34 is a collar 39, the collar being welded to an annular spacer 41 to thereby provide an inwardly flanged portion overlying the free end of the head. An attaching eyelet 42 is also welded to the spacer 41 and the collar 39. As will be evident from FIG. 4, the head 34 has clearance with respect to the collar 39 and also with respect to the end of the sleeve 37 and the spacer 41.

In operation, the link may be extended or retracted by rotation of the crankshaft 24. Rotation of the crankshaft is transmitted to the spindle 17 which is extended from or retracted into the frame 10 depending upon the direction of rotation of the spindle. During the spindle rotation the eyelet 42 does not rotate, the clearance between the head and the enclosing collar 39 preventing the transmission of rotation of the spindle to the collar and, consequently, to the eyelet 42. When the spindle 17 is being extended from the frame the left hand (as viewed in FIG. 4) margin of the head 34 will bear against the spacer 41. When the spindle is rotated so as to retract the spindle into the frame, the head 34 will engage the adjacent end face of the sleeve 37 and the clearance will appear between the spacer 41 and the head 34.

While the invention has been disclosed and described in some detail in the drawings and foregoing description, they are to be considered as illustrative and not rectrictive in character, as other modifications may readily suggest themselves to persons skilled in this art and within the broad scope of the invention, reference being had to the appended claims.

The invention claimed is:

1. An adjustable link comprising an elongated frame, an attaching eyelet rigidly secured to one end of said frame, a member carried by said frame adjacent its opposite end and having a threaded aperture therein, a threaded spindle extending through said aperture and having threaded engagement with said member, cooperating guide means on said spindle and said frame for maintaining said spindle and frame in axially parallel relation as said spindle is moved through said threaded aperture, a crankshaft adapted for manual rotation joined to said spindle by a U-joint transmitting rotation of said shaft to said spindle, said crankshaft being supported by said frame so as to extend angularly therefrom, and means for non-rotatably securing an attaching eyelet to the end of said spindle protruding beyond said threaded aperture, said means including an enlarged cylindrical head on said spindle, a bearing sleeve encircling an unthreaded portion of said spindle immediately adjacent said head, a collar freely encircling said head and rigidly attached to said bearing sleeve, said collar having an inwardly flanged portion overlying the free end of said head, and an attaching eyelet rigidly secured to said collar, whereby upon extension or retraction of said spindle with relation to said frame said head axially shifts said collar with its attaching eyelet, the clearance between said head and said sleeve preventing transmission of rotation of said spindle to said collar.

2. An adjustable link comprising an elongated frame, an attaching element carried at one end of said frame, a member carried by said frame adjacent its opposite end and having a threaded aperture therein, a threaded spindle extending through said aperture and having threaded engagement with said member, cooperating guide means on said spindle and said frame for maintaining said spindle and frame in axially parallel relation as said spindle is moved through said threaded aperture, a crankshaft adapted for manual rotation joined to said spindle so as to transmit rotation of said shaft to said spindle, said crankshaft being supported by said frame so as to extend angularly therefrom, and means for non-rotatably securing an attaching element to the end of said spindle protruding beyond said threaded aperture, said means including an enlarged cylindrical head on said spindle, a bearing sleeve encircling an unthreaded portion of said spindle immediately adjacent said head, a collar freely encircling said head and rigidly attached to said bearing sleeve, said collar having an inwardly flanged portion overlying the free end of said head, and an attaching element rigidly secured to said collar, whereby upon extension or retraction of said spindle with relation to said frame said head axially shifts said collar with its attaching element, the clearance between said head and said sleeve preventing transmission of rotation of said spindle to said collar.

3. An adjustable link comprising an elongated frame, an attaching element carried at one end of said frame, a threaded aperture formed at the opposite end of said frame, a threaded spindle extending through said aperture and having threaded engagement with said member, cooperating guide means on said spindle and said frame for maintaining said spindle and frame in axially parallel relation as said spindle is moved through said threaded aperture, manually operable means for rotation of said spindle, and means for non-rotatably securing an attaching element to the end of said spindle protruding beyond said threaded aperture, said means including an enlarged cylindrical head on said spindle, a bearing sleeve encircling an unthreaded portion of said spindle immediately adjacent said head, a collar freely encircling said head and rigidly attached to said bearing sleeve, said collar having an inwardly flanged portion overlying the free end of said head, and an attaching element rigidly secured to said collar, whereby upon extension or retraction of said spindle with relation to said frame said head axially shifts said collar with its attaching element, the clearance between said head and said sleeve preventing transmission of rotation of said spindle to said collar.

References Cited by the Examiner
UNITED STATES PATENTS

| | | | |
|---|---|---|---|
| 243,859 | 7/1881 | Cushing | 287—91 |
| 1,356,033 | 10/1920 | Billingsley | 254—126 |
| 2,487,085 | 11/1949 | Wridge | 287—91 |
| 2,819,104 | 1/1958 | Forsyth | 287—59 |
| 2,998,734 | 9/1961 | Bunting | 74—586 |

FOREIGN PATENTS 432,934   8/1935   Great Britain.

FRED C. MATTERN, JR., *Primary Examiner.*

W. S. RATLIFF, *Assistant Examiner.*